United States Patent
Pollet et al.

(10) Patent No.: US 11,545,136 B2
(45) Date of Patent: Jan. 3, 2023

(54) SYSTEM AND METHOD USING PARAMETERIZED SPEECH SYNTHESIS TO TRAIN ACOUSTIC MODELS

(71) Applicant: NUANCE COMMUNICATIONS, INC., Burlington, MA (US)

(72) Inventors: Vincent Laurent Pollet, Astene (BE); Carl Benjamin Quillen, Brookline, MA (US); Philip Charles Woodland, Cambridgeshire (GB); William F. Ganong, III, Brookline, MA (US); Steven Hoskins, Dryden, NY (US)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 287 days.

(21) Appl. No.: 16/659,159

(22) Filed: Oct. 21, 2019

(65) Prior Publication Data
US 2021/0118425 A1    Apr. 22, 2021

(51) Int. Cl.
| | |
|---|---|
| G10L 15/06 | (2013.01) |
| G10L 15/22 | (2006.01) |
| G10L 13/047 | (2013.01) |
| G10L 15/30 | (2013.01) |
| G10L 15/183 | (2013.01) |
| G10L 13/00 | (2006.01) |

(52) U.S. Cl.
CPC ............ *G10L 15/063* (2013.01); *G10L 13/00* (2013.01); *G10L 13/047* (2013.01); *G10L 15/183* (2013.01); *G10L 15/22* (2013.01); *G10L 15/30* (2013.01)

(58) Field of Classification Search
USPC ............... 704/231, 235, 246, 247, 251, 252
See application file for complete search history.

(56) References Cited

U.S. PATENT DOCUMENTS

| | | | | |
|---|---|---|---|---|
| 5,970,453 | A * | 10/1999 | Sharman | G10L 13/07 704/258 |
| 9,990,925 | B2 * | 6/2018 | Weinstein | G10L 15/06 |
| 10,832,668 | B1 * | 11/2020 | Devries | G10L 15/183 |
| 10,896,669 | B2 * | 1/2021 | Arik | G10L 25/30 |
| 11,205,428 | B1 * | 12/2021 | Bao | G10L 15/22 |
| 2013/0266127 | A1 * | 10/2013 | Schachter | H04M 3/5175 379/88.01 |
| 2016/0379639 | A1 * | 12/2016 | Weinstein | G06F 21/6254 704/235 |
| 2018/0108355 | A1 * | 4/2018 | Weinstein | G10L 15/06 |

OTHER PUBLICATIONS

WikipediA, "Word embedding", https://en.wikipedia.org/wiki/Word_embedding, Sep. 19, 2019, 5 pages.
(Continued)

*Primary Examiner* — Leonard Saint-Cyr (57) ABSTRACT

A method for removing private data from an acoustic model includes capturing speech from a large population of users, creating a text-to-speech voice from at least a portion of the large population of users, discarding speech data from a database of speech, creating text-to-speech waveforms from the text-to-speech voice and the new database of speech with the discarded speech data and generating an automatic speech recognition model using the text-to-speech waveforms.

18 Claims, 5 Drawing Sheets

(56) References Cited

OTHER PUBLICATIONS

WikipediA, "Word2vec", https://en.wikipedia.org/wiki/Word2vec, Sep. 19, 2019, 6 pages.

Doddipatla, Rama et al., "Speaker adaptation in DNN-based speech synthesis using d-vectors", Interspeech 2017, Aug. 20-24, 2017, Stockholm, Sweden, pp. 3404-3408.

Pollet, Vincent et al., "Unit selection with Hierarchical Cascaded Long Short Term Memory Bidirectional Recurrent Neural Nets", Interspeech 2017, Aug. 20-24, 2017, Stockholm, Sweden, pp. 3966-3970.

Jia, Ye et al., "Transfer Learning from Speaker Verification to Multispeaker Text-To-Speech Synthesis", 32$^{nd}$ Conference on Neural Information Processing Systems (NeurIPS 2018), Montreal, Canada.

\* cited by examiner

SYSTEM AND METHOD USING PARAMETERIZED SPEECH SYNTHESIS TO TRAIN ACOUSTIC MODELS

BACKGROUND

1. Technical Field

The present disclosure relates to generating acoustic models for use in speech processing and more specifically to new approaches for creating new acoustic models without keeping waveform data associated with specific users or a group of users, thereby maintaining operational flexibility while respecting user privacy.

2. Introduction

Traditionally, acoustic models are trained on recorded speech from one or more individual users. A respective user's recorded speech is considered their personal data. In some cases, recorded speech can be deleted at a user's request. In other scenarios, data from protected groups is sensitive personal data. For example, recordings of children speaking should not be maintained. Additionally, storing any user speech could result in privacy issues and in some scenarios, companies will age out acoustic recordings and lead them after a specific period of time.

DESCRIPTION

The present disclosure addresses the deficiencies in present systems by providing a new solution in which a method includes generating specific text-to-speech (TTS) voices to generate speech which might be similar in some characteristics to a desired user speech but that does not use personal data. In one aspect, it can be called pseudo-speaker-specific TTS speech. From the TTS voice, the system can then generate an acoustic model using the TTS voice for training data which, based on how the TTS voice was developed, is not personal data. Additionally, synthesized text does not need to be transcribed as the system can supply the text for the TTS voice. The disclosed approach allows more flexible model training and combined with data augmentation, and can enable training for applications in a new environment, sensitive populations as well as arbitrarily large amount of data.

Brief Introduction

Methods and systems are disclosed for addressing the problem outlined above. The disclosed approach provides a mechanism of gathering data from one or more of a TTS data set, and automatic speech recognition data set, and automatic speech recognition texts and combines data generated from each of these datasets into a TTS system for generating waveforms that do not use private data associated with one or more users. The waveforms can be representations including the actual waveform signal, an FFT (Fast Fourier Transform), a STFT (Short-Time-Fourier Transform), a Mel-Spectrum representation, representation by other parameters, and so forth. This disclosure covers the various representations from which speech can be generated. The generated waveforms are then used for acoustic model training to ultimately develop models that do not use the private data. This approach enables the generation of acoustic models but eliminates the issues outlined above with respect to using private data for such modeling.

Detailed Description

Various embodiments of the disclosure are described in detail below. While specific implementations are described, it should be understood that this is done for illustration purposes only. Other components and configurations may be used without parting from the spirit and scope of the disclosure. A brief introductory description of a basic general purpose system or computing device in FIG. 1, which can be employed to practice the concepts, methods, and techniques disclosed, is illustrated. A more detailed description of specific embodiments will then follow. These variations shall be described herein as the various embodiments are set forth. The disclosure now turns to FIG. 1.

Figure 1:
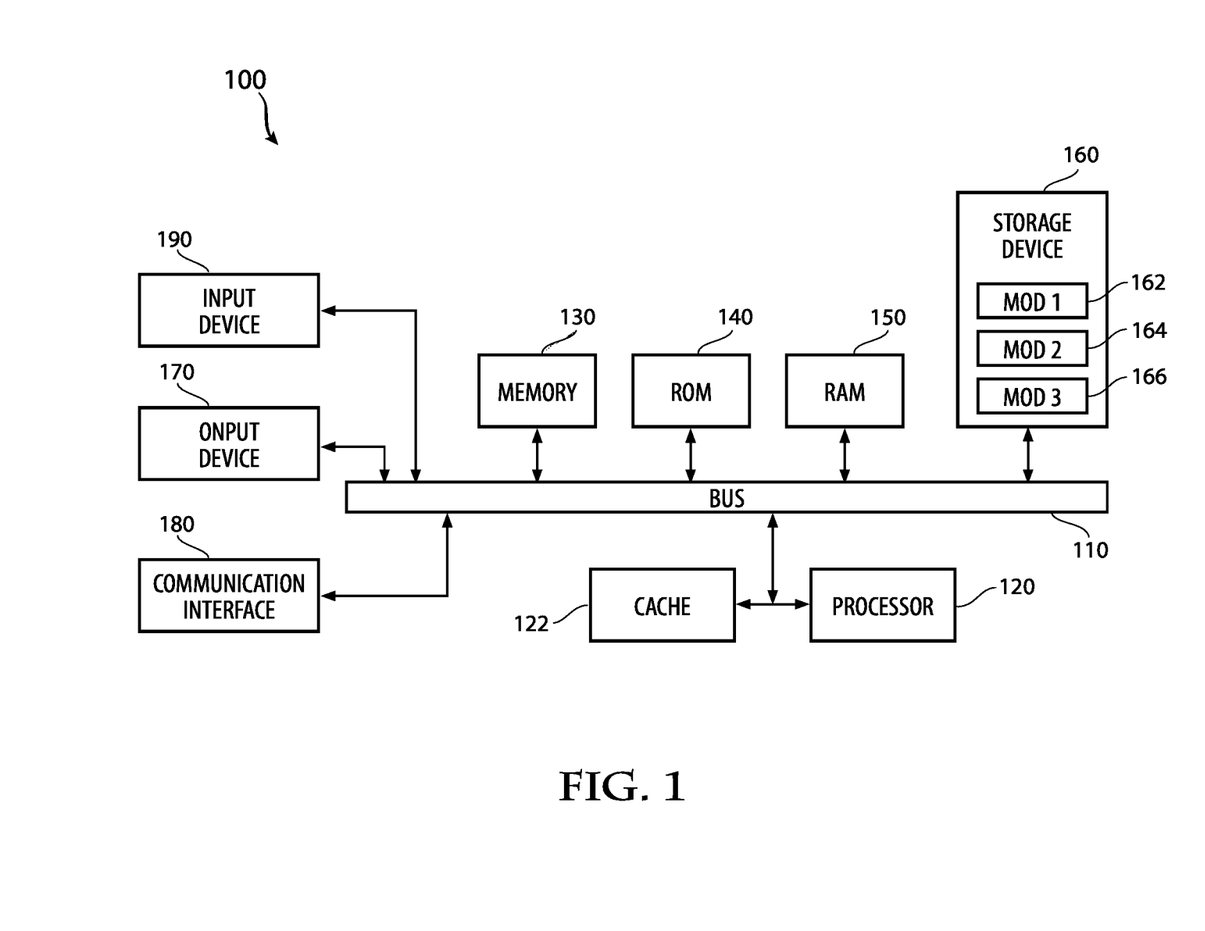
FIG. 1 illustrates an example system embodiment.

With reference to FIG. 1, an exemplary system and/or computing device 100 includes a processing unit (CPU, GPU or processor) 120 and a system bus 110 that couples various system components including the system memory 130, such as read only memory (ROM) 140 and random access memory (RAM) 150, to the processor 120. The system 100 can include a cache 122 of high speed memory connected directly with in close proximity to, or integrated as part of, the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the processor. The processor 120 may be a self-contained computing system, containing multiple cores or processors, a bus, memory controller, cache, etc. A multi-core processor may be symmetric or asymmetric. Notably, a special-purpose computer is disclosed in which the algorithms or steps disclosed herein are combined with the computer components described herein to generate the special purpose computer.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. The system 100 can include other hardware or software modules. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, bus 110, display 170, and so forth, to carry out a particular function. In another aspect, the system can use a processor and computer-readable storage medium to store instructions which, when executed by the processor, cause the processor to perform a method or other specific actions. The basic components and appropriate variations can be modified depending on the type of device, such as whether the device 100 is a small, handheld computing device, a desktop computer, or a computer server.

Although the exemplary embodiment(s) described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations. The system component of FIG. 1 can include a mute management module, which can be any of the modules 162, 164, 166 and which can operate as a local mobile or desktop device that the user holds or speaks into and/or can be a module configured on a network-based server, which can perform the specific functions disclosed herein. Furthermore, a load-balancing or sharing of the performance of specific steps can also occur in part on a local mobile device or desktop device, and a network-based server.

Figure 2:
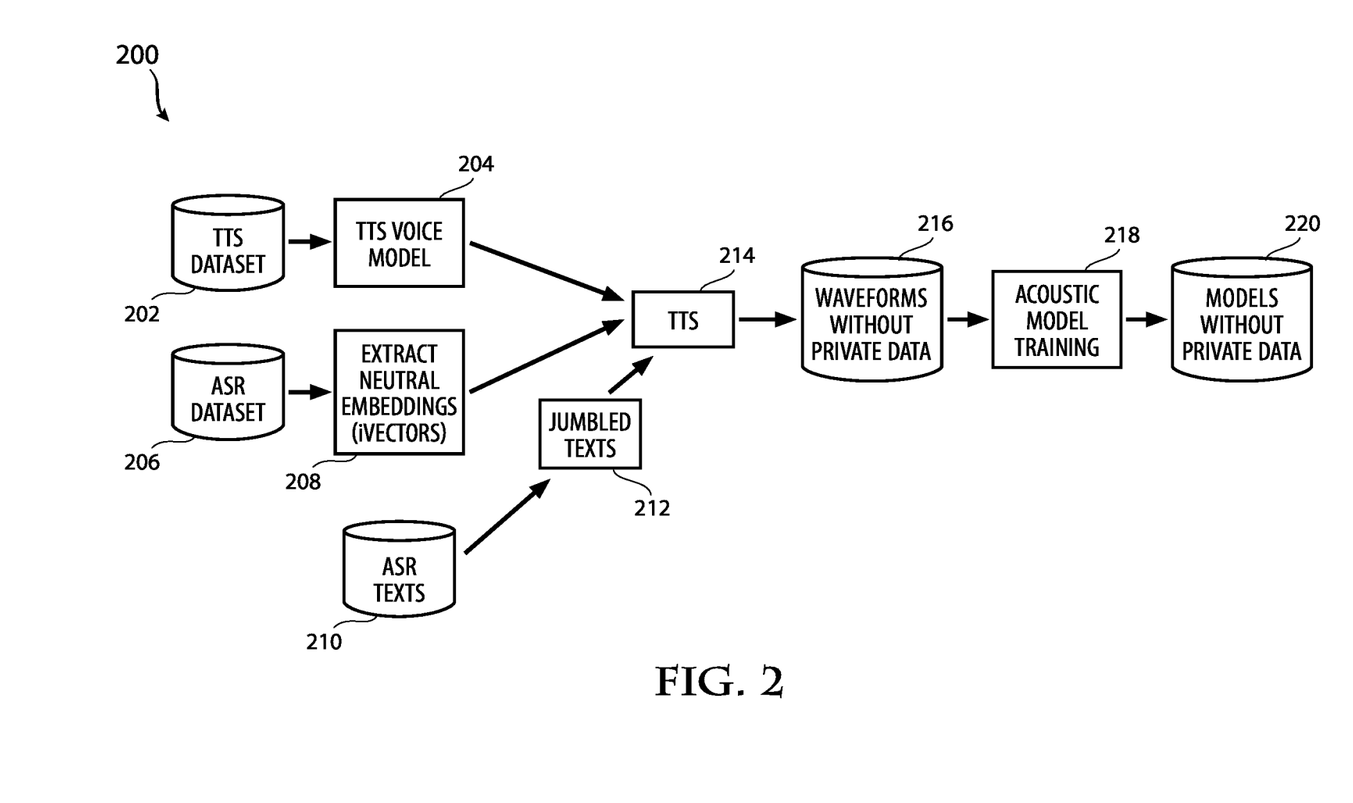
FIG. 2 illustrates basic components according to an embodiment.

Having disclosed some components of a computing system that are used to create the special-purpose computer disclosed herein, the disclosure turns to FIG. 2, which illustrates the basic components 200 of the system. As shown in FIG. 2, the various components or participants in the process can include a text-to-speech (TTS) dataset 202, a generated TTS voice model 204 drawn from the dataset 202, an automatic speech recognition dataset 206, extracted neural embeddings or iVectors 208, automatic speech recognition texts 210 and a modification of those texts or generation of new texts representing jumbled text 112.

The TTS dataset 202, ASR dataset 206 and ASR texts 210 represents personal data in general. It can be data of groups of individuals or it can be data of a single individual. These datasets can also include datasets in which some of the data is personal data with other data that would not be considered personal data. The general goal is to extract data from these data sets and perform processes on that data in such a way as to generate via a trained TTS component 214 waveforms without the private data and ultimately generate an acoustic model that does not utilize the private data.

The reference to the word "embedding" is the collective name for a set of language modeling and feature-learning techniques in natural language processing where words or phrases from the vocabulary are mapped to vectors of real numbers. Conceptually, the embedding process is a mathematical embedding from a space with many dimensions per word to a continuous vector space with a much lower dimension. Methods to generate this mapping include neural networks, dimensionality reduction on the word co-occurrence matrix, probabilistic models, explainable knowledge base methods, and explicit representations in terms of the context in which words appear. Word and phrase embeddings, when used as the underlying input representation, have been shown to boost the performance in speech processing tasks. As described herein, the embedding process can apply to the techniques disclosed herein which enable the generation of acoustic models without using private data for protected individuals or populations. One paper that provides some background material related to speech unit embedding in TTS processes includes "Unit selection with Hierarchical cascade Long Short Term Memory Bidirectional Recurrent Neural Nets" by Vincent Pollet, et al., Interspeech 2017, Stockholm, Sweden, incorporated herein by reference. Another reference which uses the adaptation of parametric TTS data using D-Vectors includes "Speaker adaptation in DNN-based speech synthesis using d-vectors", by Rama Doddipatla et al, Interspeech 2017, Stockholm, Sweden, incorporated herein by reference.

The TTS voice model 204 can be parameterized by vectors, such as, for example, D-Vectors or iVectors which can be used to create an even larger space of voices and which can be used to avoid private data. The parameterized nature of the TTS voice model enables the system to control what kind of voice is heard when the waveforms are generated 216. This disclosure describes two non-exclusive methods for building at voice adapted TTS. The parametric method employs a speaker vector (embedding) as input parameter to generate output speech waveform representations in the voice of the target speaker. The non-parametric method adapts and updates the model (full or parts of it) to create a new TTS model. The target speech output waveform representations are sub-sequentially generated with the new model. The non-parametric method builds a new TTS model for every new speaker. Furthermore, a combination is possible of parametric and non-parametric adaptation methods whereby input parameters are used with model updates.

Assumed that the ASR dataset 206 includes private data from the target population. For example, a system may store data for a large number of speakers but that might include data associated with children. Assume that the ASR dataset 206 is configured in a parameterized space such that one can extract neural embeddings, iVectors, D-Vectors or some other data structure. In one aspect, the system extracts pointers to the parameterized space within the ASR dataset 206.

Further, the ASR texts 210 can be made anonymous by jumbling those texts 212. In one example, the particular patterns of speech or particular phrases that might be used by an individual or a target population can potentially be used to identify the individual or that the member as part of a target population. The concept of jumbling the text 212 generally involves making adjustments or modifications to the actual text in order to prevent an entity from identifying an individual from the particular phrases. In one aspect, the jumbling of texts 212 involves maintaining an overall characterization of the text while determining how to make changes that might hide private data. For example, if the ASR texts all involve academic language from a target population of college professors, the jumbled text 212 would maintain the overall academic nature of the text but would adjust remove or modify particular phrases which might be unique to an individual or to a target population.

In another aspect, jumbling texts 212 might be more dramatic and designed to change the overall nature of the text from, for example, the academic context to a completely different context such as language used by children.

In one case, the jumbled text 212 might be generated simply from other speakers who did not contribute to the ASR text 210 dataset. The system may specifically limit the amount of text used per other speaker when generating the text 212 to be fed into the TTS component 214. In another aspect, the system could train speaker parameterized text generators. This could be considered a similar process the training TTS models with the exception that the output is a text or sequence rather than audio and the input might be noise or nothing at all. Thus, the text 212 component or process represented in FIG. 2 could identify a text generator that would produce text based on little input, no input, noise input, or some other kind of training or identification input such as an instruction to generate text related to children, text related to medical terms, or academic language, and so forth.

The data from one or more of component 204, 208 and 212 are fed into a TTS component 214 to generate waveforms without use of private data 216. These generated waveforms are then used for acoustic model training 218 to ultimately develop models without use of the private data 220.

Another characterization of this process is the following. In some scenarios, it is allowable to use children data or to process children data from a larger dataset as long as the children's data is not specifically identified or selected. One solution in this scenario is to create voices for many speakers and then create waveforms from those voices 216 and then identify the children (or other target population) and eliminate their original data and TTS voices and keep the new waveforms for the children. In this scenario, the waveforms that are created 216 and used for acoustic model training 218 do include in an anonymous manner the data for the target population but the private data that might be stored in connection with the target population can be deleted.

In another aspect, the system could train a general parameterized TTS model including the target population voices 204. The system can then utilize a set of parameters (e.g., vectors or neural embeddings 208) from the target population, using voices where appropriate permissions of been provided. The system can generate new vector settings from the subspace covered by the allowable voices. The TTS model 214 can embody these new vector settings and can be used to create speech and thus waveforms without the private data 216. The speech that is constructed using the vectors is not associated with any particular individual but the range of speech that is created can span the space of possible voices. The text that is used 212 is personalized in one or more different ways as described above and thus did not contain private information or suggestions which can lead back to identify an individual or target population.

In one aspect, the TTS component 214 represents an adaptation of a TTS voice model instead of creating a totally new TTS voice. This process can also include such an adaptation of the acoustic models instead of training new models. Generally speaking, the approach disclosed herein can relate to either create a totally new TTS voice and train new acoustic models or to a process of adaptation depending on a particular need. In general, the approaches may be similar.

Figure 3:
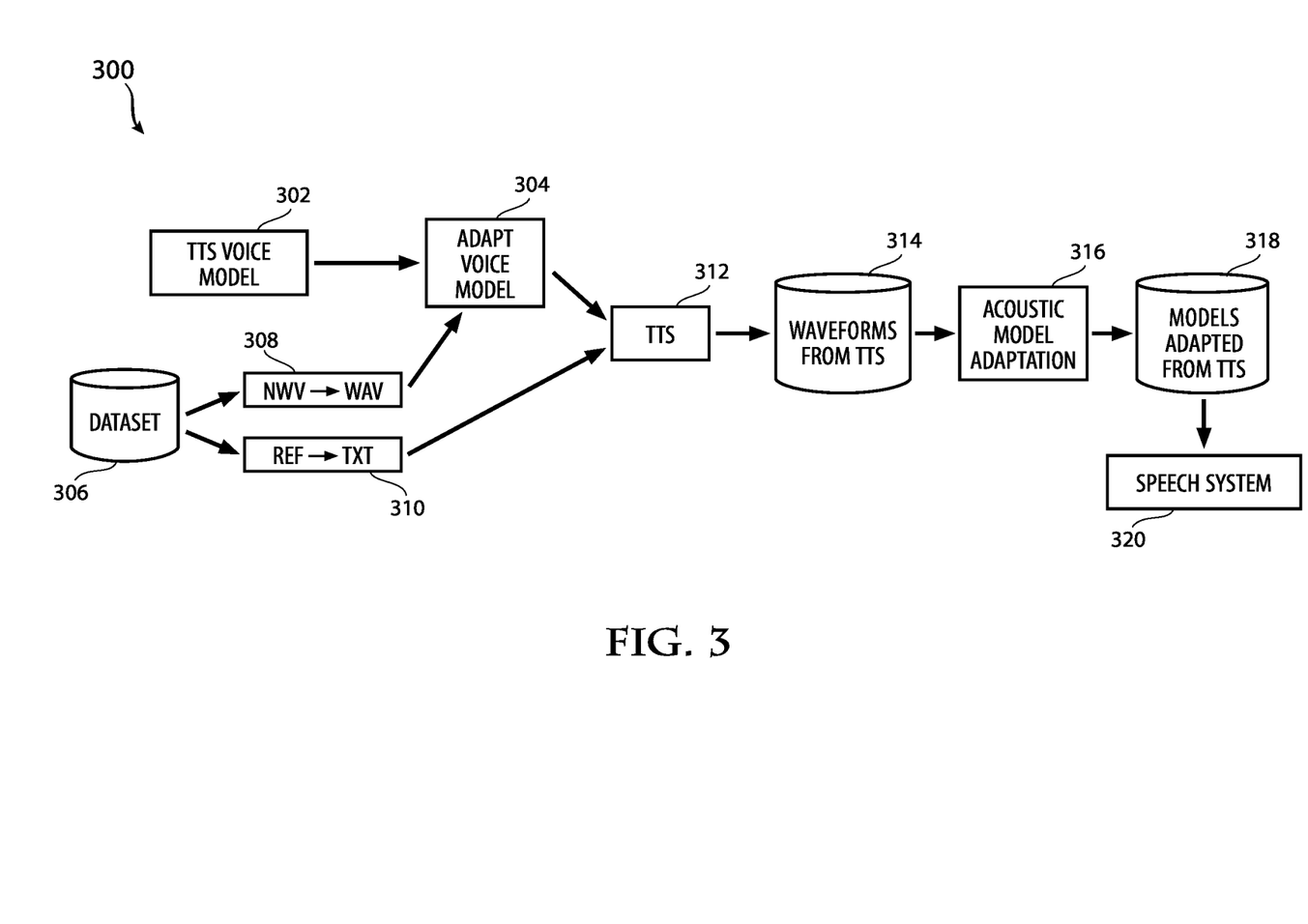
FIG. 3 illustrates an alternate set of basic components according to an embodiment.

FIG. 3 illustrates an approach in which a TTS voice model 302 is adapted 304 to create an adapted voice model 312 for an individual. A dataset 306 can provide both waveforms 308 and text 310. The speech waveforms can be adapted 308 and provided to the module that adapts the voice model 304 which can then be fed into the adapted TTS voice model 312. Adapted text 310 can also be fed into the adapted TTS module 312. The waveforms are then generated from the adapted TTS model 314. The output can be used to adapt the acoustic model 316 to yield the new models adapted from the TTS model 318. A speech system test can then be run

320 based on the adapted models. This approach in FIG. 3 can generate waveforms from a TTS model for an individual without using direct waveforms from that individual.

The experience of the inventors is that we expect that the training approach using iVectors and/or D-Vectors or similar structures should provide better performance relative to the adaptation approach. Using iVectors and/or D-Vectors, the system can generate speech from synthetic speakers, meaning that the system can produce a range of voices which span all possible voices which are not real voices and thus protect the privacy of any individual or target population.

This disclosure will reference several technical characteristics of these various datasets and how they are parameterized in a way that enables the system to protect an individual user or a group of user's privacy. For example, the TTS voice models 214 can be parameterized by iVectors or other neural network embedding. In another example, D-Vectors can be used. An iVector is a feature that represents the idiosyncratic characteristics of the frame-level features' distributive pattern. The "frame-level" can refer to an acoustic feature (such as a MFCC (Mel Frequency Cepstral Coefficient)) that is extracted from a frame of speech. A frame of speech is essentially a small segment from the speech. The small segment might be, for example, 10 ms, which can be called a frame step or stride of speech. This can also be considered within the context window of 25 ms. In this example, the 25 ms speech segments can be considered the frames and thus the acoustic features are extracted from each frame are called the frame level features. iVector extraction is essentially a dimensionality reduction of the GMM (Gaussian mixture model) supervector (although the GMM supervector is not extracted when computing the iVector). It is extracted in a similar manner with the eigenvoice adaptation scheme or the JFA (Joint Factor Analysis) technique, but is extracted per sentence (or input speech sample). In another definition, the identity vector or iVector as a spectral signature for a particular slice of speech usually a sliver of a phonemes and is not often used to cover an entire phoneme. It can be considered discrete spectral signature expressed in a form isomorphic to the Gaussian mixture of the time slice.

A supervector can include a number of different components such as a speaker-independent component, a speaker-dependent component, a channel-dependent component and a speaker-dependent residual component.

On the other hand, a D-Vector is extracted using a Deep Neural Network (DNN). To extract a D-Vector, a DNN model that takes stacked filterbank features (similar to the DNN acoustic model used in ASR) and generates the one-hot speaker label (or the speaker probability) on the output is trained. The D-Vector is the averaged activation from the last hidden layer of this DNN. So unlike the iVector framework, the D-Vector doesn't have any assumptions about the feature's distribution (the iVector framework assumes that the iVector, or the latent variable has a Gaussian distribution). The present disclosure can apply either iVectors or D-Vectors.

This disclosure discusses parameterized models. The concept of D-Vectors can be applied to speech processing in a number of ways. For example, with speech recognition, a multidimensional space (such as 100 dimensions) can be developed in automatic speech or condition model can include parameterized vectors for various speakers. Each one of the various speakers can be assigned a portion, a point or position within the high dimensional space. Different speakers that say things in similar ways, in the parameterized process, will be clustered or group within the high dimensional space. When the model recognizes speech from a new individual, it can quickly determine where in the high dimensional space the new speech belongs. The system then recognizes speech using data associated with speakers that is more similar to the new speech received by the model then from other speakers which might have speech patterns different from the new individual. This idea with respect to speech recognition has been applied to TTS systems. In a TTS system, speakers that say things in similar ways have their data parameterized in such a way that they are clustered are grouped within the TTS model. Similar speakers have similar D-Vector points in the high-dimensional space. When selecting speech portions to concatenate together to generate away form, the system can utilize the D-Vector points to selection speech.

When training a neural network to recognize voices or pictures or some other data, a problem of people have when they were using neural networks to generate pictures. The pictures are supposed to look natural. A generative adversarial network can be used in order to ultimately output pictures that have a natural look. The generative adversarial network involves a first neural net that used to create images and a second neural net that discriminates between images that look real and images that look fake. The first neural network be used to create images. The other one would be created to discriminate between real images compared to false images. These two models would be trained jointly. One model might create images which would provide a good fit with real images. However, the adversarial net is trying to distinction between real images and false images. The goal is for the first network to generate images that cannot be deemed a false by the adversarial net. The end result of applying both of these neural networks is that a picture that would be generated would also be deemed to be a real image and the output is better than a single neural net which simply generates images.

This concept is also applied to the present disclosure in which a GAN (generative adversarial network) can be used to generate a TTS voice using one neural network and then another neural network would evaluate the voice to determine whether it is similar to a real voice or not. GANs typically are comprised of two deep neural networks that are pitted one against another. A generative network generates candidates while the other discriminative network evaluates them. In the present application, the one neural network generates a TTS voice and the other neural network evaluates the voice.

Another aspect of this disclosure relates to how to handle noise. Producing waveforms using the TTS technology disclosed herein can produce background noises along with the speech. There are several different types of noise or distortions as well. For example, channel noise can be intermixed with the signal and background noise which can occur at times when there is no speech or at least no good intelligible speech. Noise can occur from equipment such as a headset style or microphone characteristics. In one aspect, ongoing channel noise can be handled like a TTS parameter and can be part of the vector. Intermittent noise events can be learned by the TTS system with unique names, perhaps even using a different alphabet. The data identifying intermittent noise could be generated at acoustic model training time by triggering with the texts. An existing database might even be segmented to find the noise and then cluster the noise. The system can then train the TTS model to use these different clusters. In another aspect, the system may just keep a set of such noises and inject them into the training without going through a separate TTS step. In another aspect, the system may pull out any noise for a portion of the processing such as generating a TTS model or producing waveforms and then in the final model put the noise back in.

Figure 4:
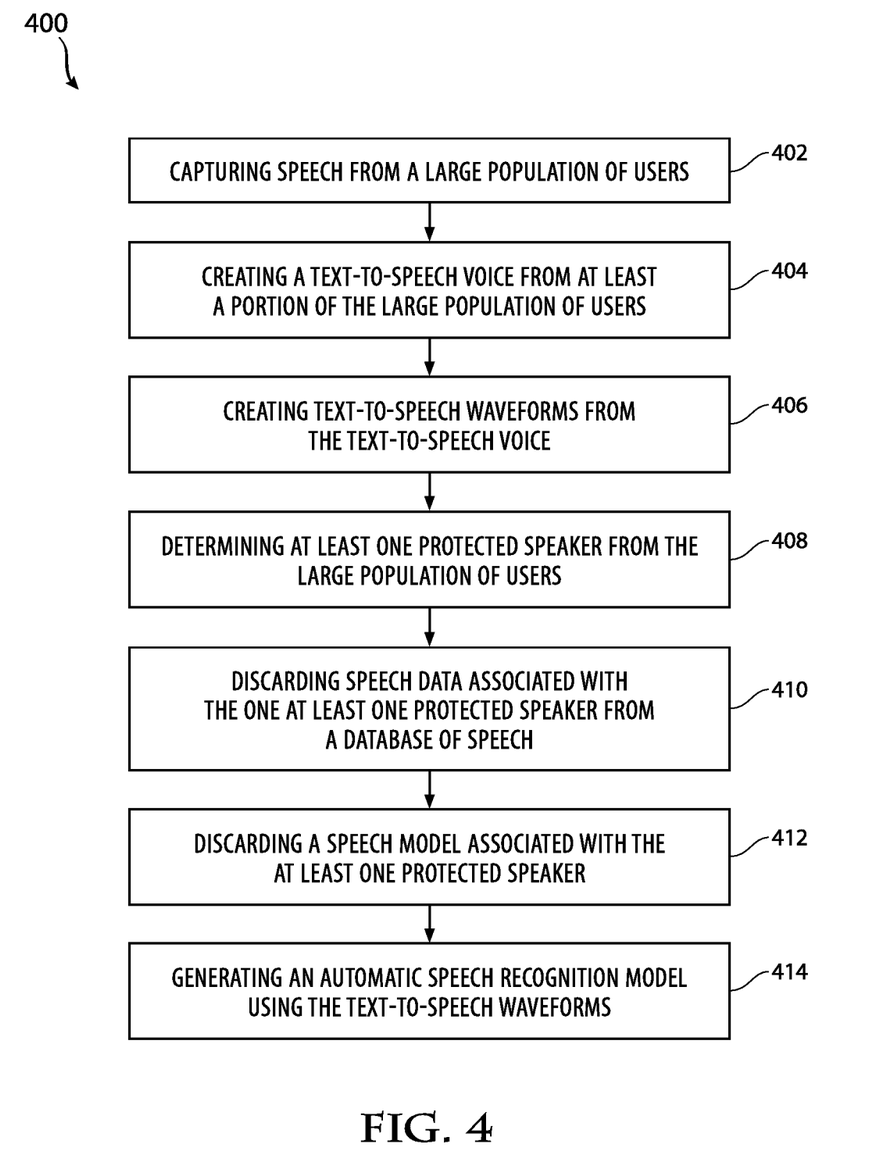
FIG. 4 illustrates a method embodiment.

FIG. 4 illustrates a method embodiment. An example method includes capturing speech from a large population of users (402), creating a text-to-speech voice from at least a portion of the large population of users (404), creating text-to-speech waveforms from the text-to-speech voice (406), determining at least one protected speaker from the large population of users (408), discarding speech data associated with the one at least one protected speaker from a database of speech (410), discarding a speech model associated with the at least one protected speaker (412) and generating an automatic speech recognition model using the text-to-speech waveforms (414). Some steps can be removed such as the capturing step or other general steps that could be combined or eliminated. The method can include one or more of the above steps. For example, the method may exclude some of the steps outlined above, such as the step of discarding the speech model associated with the at least one protected speaker.

Figure 5:
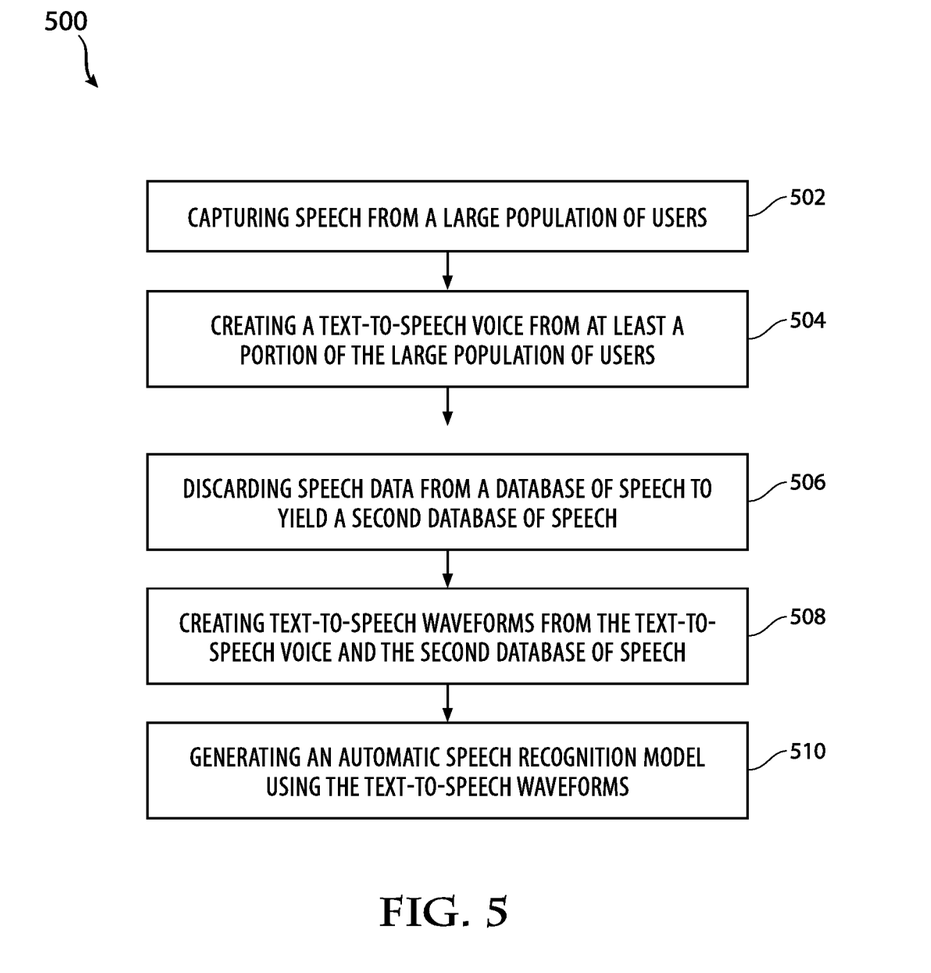
FIG. 5 illustrates another method embodiment.

FIG. 5 illustrates another method embodiment that is broader in scope than the method of FIG. 4. A method in this regard includes one or more of the steps of capturing speech from a large population of users (502), creating a text-to-speech voice from at least a portion of the large population of users (504), discarding speech data from a database of speech to yield a second database of speech (506), creating text-to-speech waveforms from the text-to-speech voice and the second database of speech (508) and generating an automatic speech recognition model using the text-to-speech waveforms (510). The steps can be performed in any order.

The speech data that is discarded can be from particular population of users, such as children or private individuals. In this regard, the speech data is associated with at least one protected speaker from the large population of users. The second database of speech will thereby exclude the speech from a particular group of users, such as the protected speaker group.

The system can maintain the text-to-speech waveforms in some form as they do not rely on private data. The capturing of the speech from the large population of users further can relate to utilizing parameterized models. The parameterized models can utilize one or more of iVectors, D-Vectors and/or a particular type of embedding. The method can also include implementing the automatic speech recognition model in a spoken dialogue system. The steps involved or performed by a spoken dialog system are considered to be part of this disclosure. The method can include interacting, via the spoken dialogue system implementing the automatic speech recognition model, with a user via speech. In another aspect, the method can include generating text for use in creating the text-to-speech voice from at least the portion of the large population of users. The text for use in creating the text-to-speech voice can include one or more of: (1) modified text from automatic speech recognition texts associated with the portion of the large population of users; and (2) generated text from users and separate from the large population of users. In yet another aspect, the component that generates or modifies the text for use in creating the text-to-speech voice can be a speaker parameterized text generator.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc., that perform particular tasks or implement particular abstract data types. Computer-executable instructions, associated data structures, and program modules represent examples of the program code for executing steps of the methods disclosed herein. The particular sequence of such executable instructions or associated data structures represent examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply to any data processing system that utilizes parameters for evaluating data input to generate output. In another aspect, the disclosure extends beyond automatic speech recognition and audio labeling to any other machine learning task which requires the use of data which might need to be made anonymous. In this regards, automatic speech recognition would just be an example task.

Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

We claim:

1. A method comprising:
capturing speech from a large population of users;
generating noise data that identifies intermittent noise in the captured speech;
clustering the generated noise data and removing the clustered noise data from the captured speech;
creating a text-to-speech voice from at least a portion of the large population of users;
storing a first database of speech associated with the large population of users, the first database of speech including speech data for the large population of users and private speech data;
discarding the private speech data from the first database of speech to yield a second database of speech, wherein the second database of speech includes the speech data for the large population of users, and wherein the private speech data is associated with at least one protected speaker from the large population of users;
creating text-to-speech waveforms from the text-to-speech voice and the yielded second database of speech; and
generating an automatic speech recognition model using the created text-to-speech waveforms.

2. The method of claim 1, wherein the capturing of the speech from the large population of users further comprises utilizing parameterized models.

3. The method of claim 2, wherein the parameterized models utilize one or more of iVectors, D-Vectors or a particular type of embedding.

4. The method of claim 1, further comprising:
implementing the automatic speech recognition model in a spoken dialogue system.

5. The method of claim 4, further comprising:
interacting, via a spoken dialogue system implementing the automatic speech recognition model, with a user via speech.

6. The method of claim 1, further comprising:
generating text for use in creating the text-to-speech voice from at least the portion of the large population of users.

7. The method of claim 6, wherein the text for use in creating the text-to-speech voice comprises one or more of: (1) modified text from automatic speech recognition texts associated with the portion of the large population of users; and (2) generated text from users and separate from the large population of users.

8. The method of claim 6, wherein generating the text for use in creating the text-to-speech voice is performed by a speaker parameterized text generator.

9. A system comprising:
at least a processor; and
a computer-readable storage medium having instructions stored which, when executed by at least the processor, cause at least the processor to perform operations comprising:
capturing speech from a large population of users;
generating noise data that identifies intermittent noise in the captured speech;
clustering the generated noise data and removing the clustered noise data from the captured speech;
creating a text-to-speech voice from at least a portion of the large population of users;
storing a first database of speech associated with the large population of users, the first database of speech including speech data for the large population of users and private speech data;
discarding the private speech data from the first database of speech to yield a second database of speech, wherein the second database of speech includes the speech data for the large population of users, and wherein the private speech data is associated with at least one protected speaker from the large population of users;
creating text-to-speech waveforms from the text-to-speech voice and the yielded second database of speech; and
generating an automatic speech recognition model using the created text-to-speech waveforms.

10. The system of claim 9, wherein the capturing of the speech from the large population of users further comprises utilizing parameterized models.

11. The system of claim 10, wherein the parameterized models utilize one or more of iVectors, D-Vectors or a particular type of embedding.

12. The system of claim 9, wherein the computer-readable storage medium stores additional instructions stored which, when executed by the processor, cause the processor to perform operations further comprising implementing the automatic speech recognition model in a spoken dialogue system.

13. The system of claim 12, wherein the computer-readable storage medium stores additional instructions stored which, when executed by the processor, cause the processor to perform operations further comprising:
interacting, via a spoken dialogue system implementing the automatic speech recognition model, with a user via speech.

14. The system of claim 9, wherein the computer-readable storage medium stores additional instructions stored which, when executed by the processor, cause the processor to perform operations further comprising:
generating text for use in creating the text-to-speech voice from at least the portion of the large population of users.

15. The system of claim 14, wherein the text for use in creating the text-to-speech voice comprises one or more of: (1) modified text from automatic speech recognition texts associated with the portion of the large population of users; and (2) generated text from users and separate from the large population of users.

16. The system of claim 14, wherein generating the text for use in creating the text-to-speech voice is performed by a speaker parameterized text generator.

17. A computer-readable storage device having instructions stored which, when executed by a processor, cause the processor to perform operations comprising:
capturing speech from a large population of users;
generating noise data that identifies intermittent noise in the captured speech;
clustering the generated noise data and removing the clustered noise data from the captured speech;
creating a text-to-speech voice from at least a portion of the large population of users;
storing a first database of speech associated with the large population of users, the first database of speech including speech data for the large population of users and private speech data;
discarding the private speech data from the first database of speech to yield a second database of speech, wherein the second database of speech includes the speech data for the large population of users, and wherein the private speech data is associated with at least one protected speaker from the large population of users;
creating text-to-speech waveforms from the text-to-speech voice and the yielded second database of speech; and
generating an automatic speech recognition model using the created text-to-speech waveforms.

18. The computer-readable storage device of claim 17, wherein the computer-readable storage device stores additional instructions stored which, when executed by the processor, cause the processor to perform operations further comprising:
generating text for use in creating the text-to-speech voice from at least the portion of the large population of users.

* * * * *